May 18, 1948.　　　D. R. MATTOON　　　2,441,892
VESSEL ASSEMBLY
Filed July 13, 1944
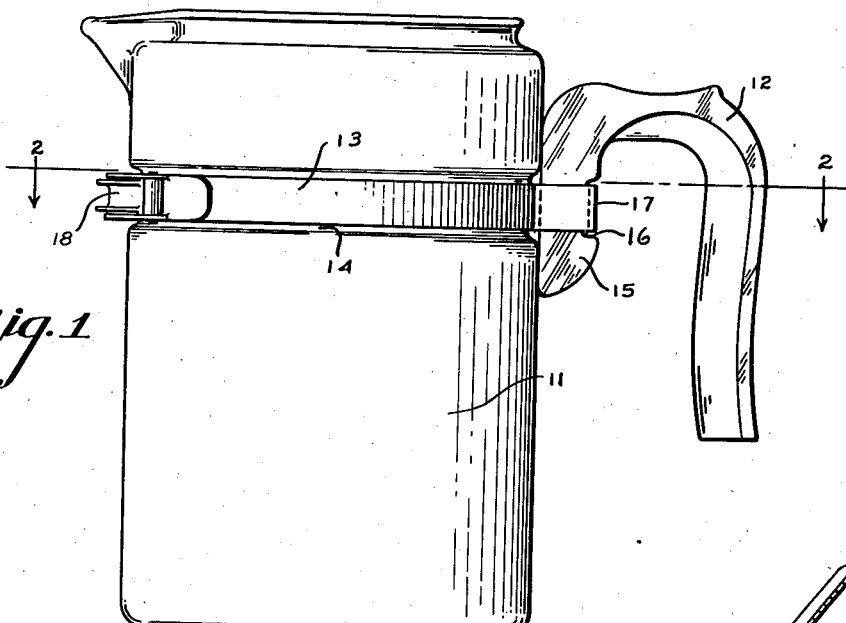
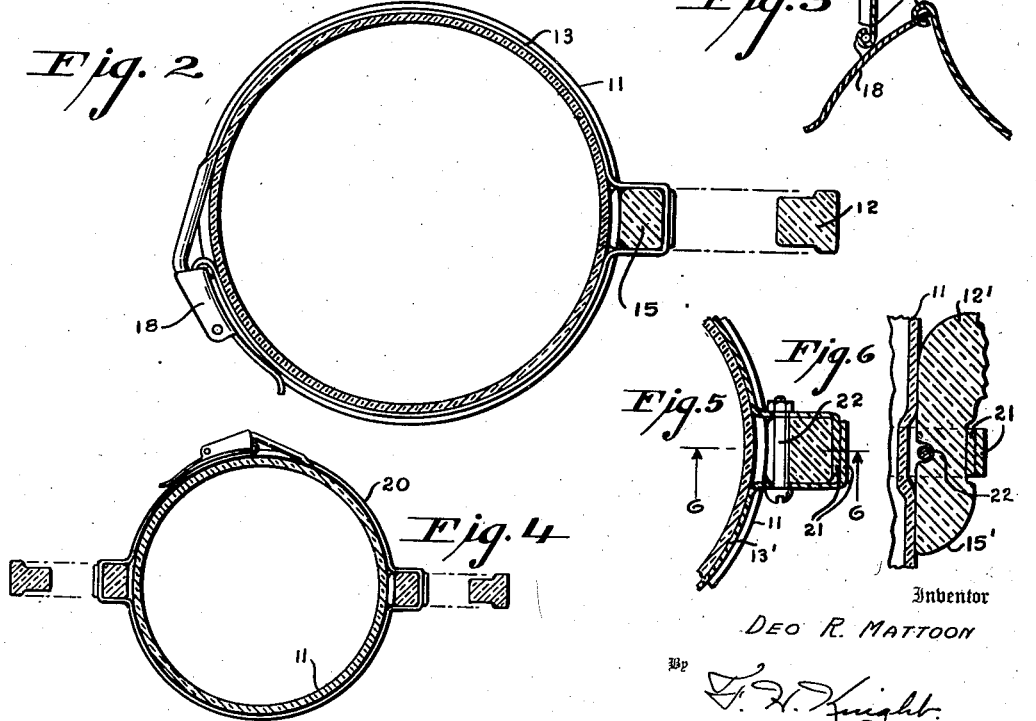
Inventor
DEO R. MATTOON
By
F. H. Knight
Attorney Patented May 18, 1948

2,441,892

UNITED STATES PATENT OFFICE 2,441,892

VESSEL ASSEMBLY

Deo R. Mattoon, Corning, N. Y., assignor to Corning Glass Works, Corning, N. Y., a corporation of New York Application July 13, 1944, Serial No. 544,802

1 Claim. (Cl. 294—27)

1

The present invention relates to vessel assemblies most commonly employed for culinary purposes and particularly to ware made of vitreous material such as glass and the like, although equally applicable to vessels made of other materials.

One object of the invention is a vessel assembly equipped with a readily removable handle.

Another object is a vessel handle holding structure of simple and novel design suitable for holding a handle of simple and rugged configuration rigidly attached to, but readily removable from, a vessel which may also be of simple configuration.

Another object is a vessel equipped with a readily removable handle which is freed from its holding band coincident with its release from the vessel.

In the accompanying drawing:

Fig. 1 is a side elevational view of an assembly embodying the invention;

Fig. 2 is a sectional view taken on line 2—2 of Fig. 1;

Fig. 3 is an enlarged view of a fragment of the handle holding band;

Fig. 4 is a sectional view illustrating an alternative embodiment of the invention;

Fig. 5 is an enlarged sectional view illustrating a modified form of the invention; and Fig. 6 is a view taken on line 6—6 of Fig. 5.

The vessel assembly as illustrated in Fig. 1 consists of a vessel 11, a handle 12 and a band 13. The vessel 11 has a surrounding groove 14 in its side wall adapted for occupation by band 13. Handle 12 has an elongated portion 15 for attachment to the vessel. Preferably, portion 15 is rectangular in cross section and provided with a groove 16 for receipt of a portion 17 of band 13. The band 13 is preferably made of half hard or No. 2 temper metal and is provided with a diameter reducing clamp 18 which when actuated from its released position (Fig. 3) to the operative position, illustrated in Figs. 1 and 2, tightly clamps the handle 12 against the vessel wall.

The length of handle portion 15 in contact with the vessel wall is substantially three times the width of groove 14 and accordingly serves to give great resistance to relative rocking movement in a vertical plane between the handle and vessel. Similarly, the rather broad surface of portion 15 contacting the vessel wall assists band 13 in preventing material lateral twisting of the handle relative to the vessel. Since the vessel groove 14 and handle groove 16 are both occupied by band 13, slippage of the handle up or down along the vessel wall is also positively prevented.

In the modified form of the invention illustrated in Fig. 4, the handle holding band 20 differs from band 13 in that two handle holding portions are provided, enabling a vessel to be provided with two handles as may often prove desirable on large vessels when used as tableware.

In the form of the invention illustrated in Figs. 5 and 6, the band 13' is in the form of a plain strap whose ends are shaped to wrap around the portion 15' of a handle 12'. The band 13' is pierced to accommodate a bolt 22 which passes through a notch formed in handle portion 15' and serves to tightly clamp the band 13' about the vessel and also about the handle portion. The latter construction does not require use of a clamp 18, although such a clamp can be used in combination therewith if ready removability is desired.

As will be understood from the foregoing, considerable variation in the form of construction of the vessel holding portion of the handle may be resorted to well within the bounds of the invention as contemplated and claimed.

What is claimed is:

In a vessel and handle assembly, a vessel having a side wall with an annular groove therein, a unitary imperforate U-shaped handle of non-circular cross-section in which one side of the U serves as a grip portion and the other side of the U serves as a vessel contacting portion, said vessel contacting portion being of such length and so contoured as to fit smoothly against the wall of the vessel and bridge the annular groove therein, said vessel contacting portion of the handle having a groove in an outer surface, not in contact with the vessel wall, which is of the same width as the groove in the vessel, a unitary continuous band positioned in said grooves and extending around the vessel and said vessel contacting portion of said handle and provided with a toggle device for clamping said band about said vessel and handle, a continuous section of said band being so contoured as to be in contact with the wall of said vessel immediately adjacent both sides of said vessel contacting portion of said handle and to be in contact with the outer surface of said vessel contacting portion of said handle at points intermediate said first-named portions, said band, when clamped about said vessel, being the only means for attaching said handle to said vessel.

DEO R. MATTOON.

(References on following page)

REFERENCES CITED

The following references are of record in the file of this patent:

UNITED STATES PATENTS

| Number | Name | Date |
|---|---|---|
| 1,066,923 | Kuekes | July 8, 1913 |
| 1,220,466 | Schultz | Mar. 27, 1917 |
| 1,406,052 | Matthiasen | Feb. 7, 1922 |
| 1,838,348 | Woodman | Dec. 29, 1931 |
| 2,275,876 | Werfel | Mar. 10, 1942 |
| 2,307,145 | Mattoon | Jan. 5, 1943 |
| 2,361,417 | Reichart | Oct. 31, 1944 |
| 2,378,866 | Reichart | June 19, 1945 |

FOREIGN PATENTS

| Number | Country | Date |
|---|---|---|
| 139,789 | Great Britain | Dec. 23, 1920 |